Oct. 2, 1962 A. GLAZE 3,056,432
PERMEABLE AIRFOIL SKIN MATERIAL
Filed April 30, 1956 2 Sheets-Sheet 1
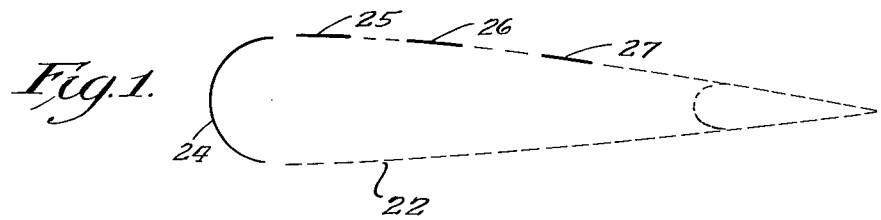
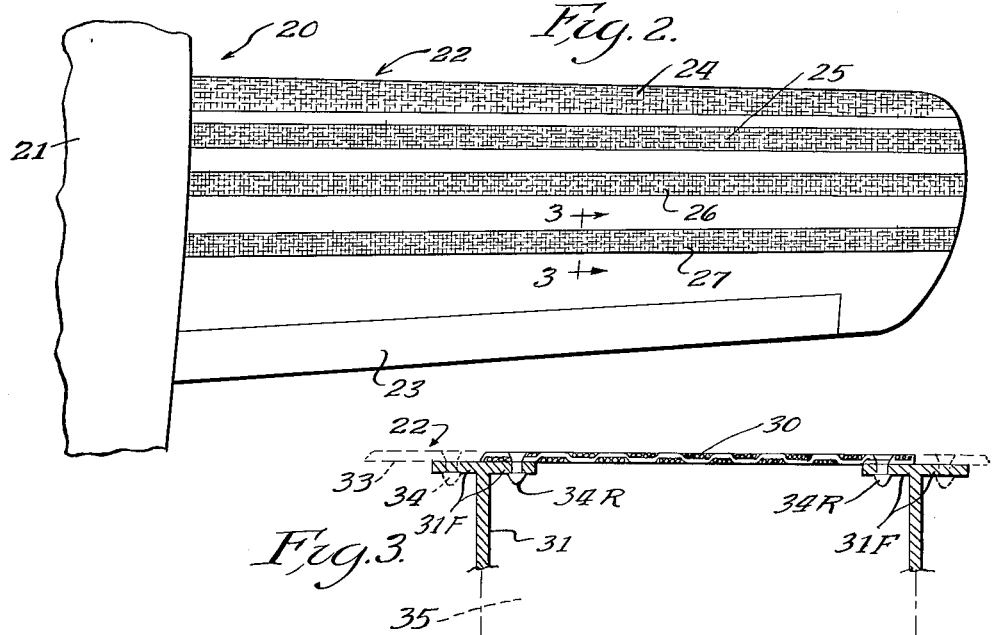
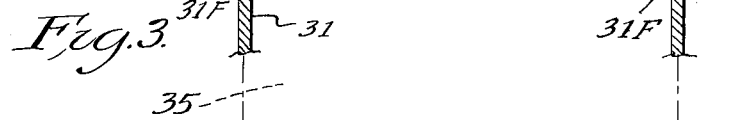
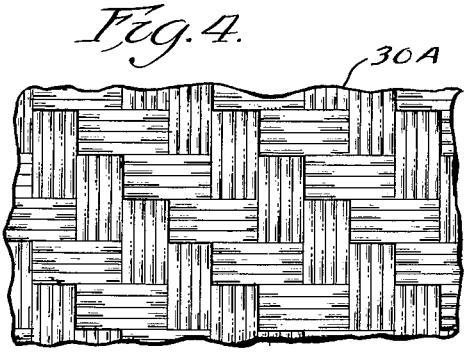
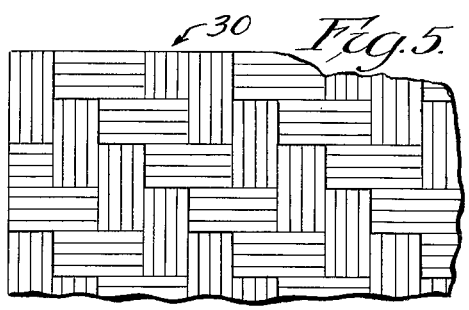
Inventor
Ardelle Glaze
By Mann, Brown and McWilliams
Attys.

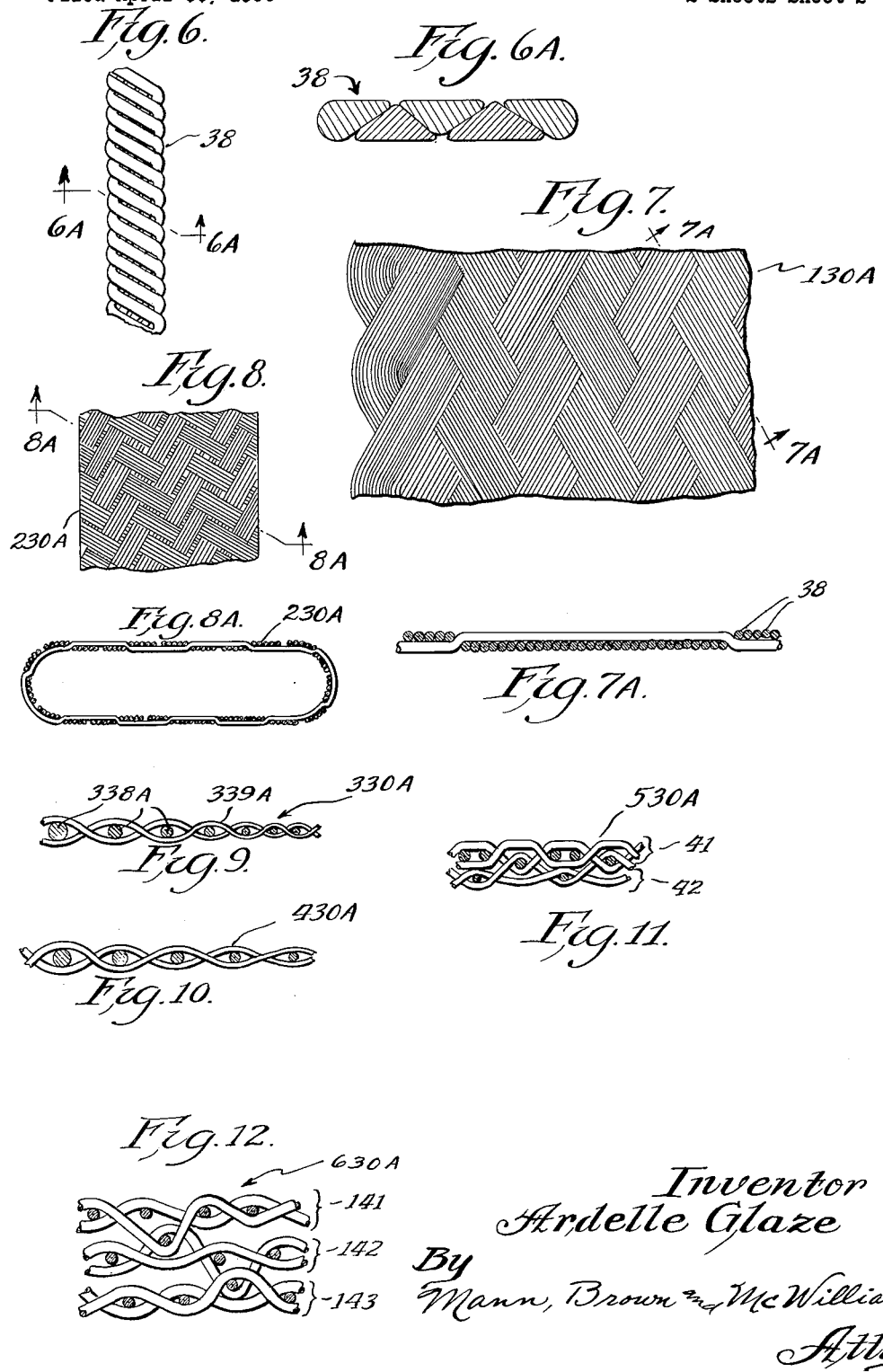

United States Patent Office 3,056,432
Patented Oct. 2, 1962

3,056,432
PERMEABLE AIRFOIL SKIN MATERIAL
Ardelle Glaze, Fort Wayne, Ind., assignor to Fort Wayne Metals, Inc., a corporation of Indiana
Filed Apr. 30, 1956, Ser. No. 581,678
2 Claims. (Cl. 139—425)

This invention relates to airfoil skin material, and particularly to such material that is permeable in character.

While airfoils are most commonly recognized as constituting the lift or reaction elements of aircraft, it is of course known that airfoil surfaces are employed in many other structures where reaction is to be obtained from gaseous flow over formed surfaces as, for example, in propellers, turbine blades, jet engine blades, after-burner buckets and the like, and in the present disclosure the term "airfoil" is to be considered as having the broad connotation which includes reaction surfaces of the aforesaid character.

Thus, as applied specifically to the design and operation of aircraft it is known that it is often desirable to provide for passage of fluid such as air through at least certain areas of the skin material of the aircraft, particularly in the airfoil sections thereof. Such passage of fluid through the skin material may be desired for several different reasons, one of the most common of which is the attainment of boundary layer control where air is drawn inwardly by suction or blown outwardly in selected areas of the wing surfaces, fuselage surfaces, tail surfaces, nose surfaces and the like so as to improve the lift and drag and other performance characteristics thereof. Another situation, in which passage of air through certain areas of the skin material of an airfoil is desirable, is for the purpose of producing a de-icing action and in such instances warm air is forced through leading edge surfaces of the wings to break up ice formation. Still a third instance where such fluid flow through the skin material is desired is found in high-speed, high altitude flying where undue heating of the surfaces of the aircraft requires the application of a cooling media, and this cooling may be accomplished by the passage of fluid through the airfoil or aircraft skin materials to effect what is known as transpiration cooling. Other instances where such fluid flow may be advantageously employed are found in jet engine blades, after-burner buckets and other high temperature applications where effective cooling is highly desirable.

In such uses of a permeable skin material, attainment of the desired function in a uniform manner requires that the degree of permeability of the skin material be precisely controlled or determined, and since this material is in contact with the air stream, the surface of the permeable material must have the maximum smoothness that is consistent with the permeable character of the material. Such permeable skin material as it is incorporated in the structure of an airfoil must of course be utilized in most instances in areas that correspond to the normal location of the sheet metal material that is customarily used, and must possess comparable strength and must be capable of being readily attached to the frame of the airfoil in the varying and curved shapes that are required. Moreover, the exposed surfaces of the skin material must be corrosion resistant to salt water, oils and fuels and at elevated temperatures.

With the standards that are thus established for permeable airfoil skin materials, the prior efforts along this line have resulted in materials that lacked one or more of the aforesaid desirable characteristics, and in view of this, it is the primary object of the present invention to afford a permeable airfoil skin material that has all of the aforesaid desirable characteristics and which may be made at a reasonable cost.

Other and further objects related to the foregoing are to afford such a permeable airfoil skin material that is adaptable to conventional methods of manufacture and assembly used in aircraft and airfoil construction, and which is adapted for convenient manufacture in such a way that the desired degree of permeability may be readily attained and in which varying degrees of permeability within the same piece of material may readily be attained.

Other and further objects of the present invention will be apparent from the following description and claims, and are illustrated in the accompanying drawings, which by way of illustration, show preferred embodiments of the present invention and the principles thereof, and what I now consider to be the best mode in which I have contemplated applying these principles. Other embodiments of the invention embodying the same or equivalent principles may be used and structural changes may be made as desired by those skilled in the art without departing from the invention.

In the drawings:

FIG. 1 is a schematic cross sectional view of an airfoil section embodying several sections of permeable skin material at points adapted for attaining the different functions hereinabove mentioned;

FIG. 2 is a somewhat diagrammatic plan view of the airfoil section shown in FIG. 1;

FIG. 3 is an enlarged vertical section taken substantially along the line 3—3 of FIG. 2 and illustrating a section of the permeable skin material secured in position on elements of the air frame structure;

FIGS. 4 and 4A are plan and cross sectional views, respectively, of a woven wire fabric utilized in producing the material of the present invention;

FIGS. 5 and 5A are plan and sectional views, respectively, of sheet material embodying the present invention;

FIGS. 6 and 6A are plan and cross sectional views of a flattened multiple wire strand that may be used in weaving wire cloth for producing the present material;

FIG. 7 is a plan view of a flat braided wire fabric which, upon rolling, will produce a permeable sheet according to the present invention;

FIG. 7A is a cross sectional view taken substantially along line 7A—7A of FIG. 7;

FIGS. 8 and 8A are plan and cross sectional views, respectively, of a tubular braided wire fabric, which, in FIG. 8A, has been flattened to produce a material according to the present invention;

FIG. 9 is a cross sectional view of a woven wire fabric in which the wires in one direction of the weave are made progressively smaller to attain gradually varying permeability;

FIG. 10 is a cross sectional view of a wire fabric that has been treated after weaving to produce varying permeability;

FIG. 11 is a cross sectional view of a compound or multilayer woven layer fabric that may be used in preparing the sheet material of the present invention; and FIG. 12 is a cross sectional view of another compound or multiple layer wire fabric in which different kinds of wire may be employed in different layers thereof.

For purposes of disclosure the invention has been illustrated in FIGS. 1 to 3 as embodied in certain of the airfoil surfaces of an aircraft 20 having a fuselage 21 and wings 22, only one of which is shown. So far as the present invention may be concerned, the airfoil section may take many different forms and may be adapted and designed for other uses, such as those hereinabove mentioned. As herein illustrated, the airfoil section is illustrated diagrammatically in FIG. 1 as being of the type conventionally used in the wing structures of relatively low-speed aircraft. The airfoil section 22 has the usual rear edge flap 23, and certain of the skin surfaces of the airfoil section 22 are diagrammatically indicated in FIGS. 1 and 2 as embodying permeable skin sections 24, 25, 26 and 27. The permeable sections, as herein shown, extend throughout substantially the entire length of the wing 22, but the length and location thereof may of course vary in accordance with the function that is to be performed by the permeable sections and in accordance with the particular airfoil design. Thus, in the present instance the permeable section 24 is provided along the leading edge of the wing 22, while the permeable sections 25, 26 and 27 are provided in the upper surface of the wing and extend longitudinally thereof at points spaced from front to rear in accordance with the locations of the areas of turbulence encountered with the particular airfoil section that is embodied in the wing 22.

As hereinabove pointed out, these permeable skin sections on the airfoil may serve different functions. Thus the permeable section 24 along the leading edge of the wing may serve for the passage of fluid such as air outwardly through such surface either for the purpose of breaking up ice formation on the leading edge of the wing, or to permit fluid cooling media to pass through skin material of the wing where transpiration cooling is desired. The permeable sections 25, 26 and 27 in the upper surface of the wing 22 or in other surfaces of this or other elements of the airplane may serve for either outward or inward passage of air to limit and control turbulence along this surface, thus to function in attaining boundary layer control for the wing, or for fluid transmission in attaining transpiration cooling.

Under and in accordance with the present invention, the permeable areas in the airfoil skin surface are provided by a sheet material that is made from a wire fabric which, after formation, is rolled to provide an outer smooth surface, and sheet material which approximates the thickness, structural strength and workability of the skin sheet metal that is normally used as the skin material for aircraft. Thus, such a rolled wire fabric is indicated at 30 in FIG. 3 of the drawings as spanning the space between a pair of internal structural members 31 that form a part of the air frame, and these structural members 31 have flanges 31F to which metal sheets 33 that constitute the usual skin material of the aircraft are secured as by rivets 34. The permeable sheet 30 of the present invention is disposed in the space between the edges of the adjacent sheets 33 and is similarly secured in place as by rivets 34R. In the overlaying areas of the permeable sheet 30, such sheet may be brazed or welded so as to fill the interstices and join the adjacent wires, and this will, of course, strengthen the mounting of the permeable sheet. The space defined between the internal structural members 31 may be utilized in forming a fluid or air passage indicated at 35 in FIG. 3 so that the desired flow of fluid through the permeable sheet 30 may be induced either by suction where an inward flow of air through the sheet is desired, or by pressure so as to cause outward fluid flow through the sheet.

Under the present invention the permeable sheet 30 may be formed in different ways as, for example, through the initial formation by weaving of a wire fabric 30A, as shown in FIGS. 4 and 4A, the particular weave of the wire fabric shown in these figures being a multiple strand twill, but the particular pattern or type of weave may be varied as desired. In this form the original round cross section of the individual wires is, of course, maintained during the weaving operation and the wires have rounded curves at those points where they pass from one side to the other of the fabric. The fabric is made from stainless steel wire or other wire having high resistance to corrosion, and after weaving the fabric is subjected to a rolling operation to produce smoothed surfaces on the fabric as indicated in FIGS. 5 and 5A of the drawings.

The warp and weft of the wire fabric have been illustrated in FIGS. 4 and 5 as being made up of individual wires of round cross section, but this may be varied as, for example, through the use of a stranded wire 38 as shown in FIGS. 6 and 6A of the drawings. The strand 38 shown in FIGS. 6 and 6A is made up of five wires and the strand has been flattened as by rolling. A strand such as this may be used in place of individual warp and weft members illustrated in FIGS. 4 and 5, and the strand may comprise different numbers and sizes of wire and may be used in its original round form or in flattened form.

Suitable warp and weft elements may also be formed by knitting of thin stainless steel or like wire into a tubular fabric, and thereafter twisting this knitted tubular member into a strand that may be utilized in the weaving or like operation.

The permeable sheet may also be produced through the use of braided wire, and in FIGS. 7 and 7A of the drawings a multiple strand flat braided fabric 130A is illustrated wherein each of the strands comprises a plurality of wires 38 of round cross section. After braiding, the fabric 130A is passed through rollers so as to provide smooth surfaces on the braided member, and the wires that are used in the braiding operation are of such a size that the finished sheet is not only permeable, but has strength sufficient to provide for mounting of the permeable sheet in the manner described in respect to FIG. 3 of the drawings.

In FIGS. 8 and 8A, a tubular braided member 230A is illustrated as being made up of a wire of stainless steel or like material, and after braiding, the tubular member 230A is compressed and rolled so that the two thicknesses of the tubular member are pressed one against the other to produce a permeable sheet having the desired structural strength and permeability, and in the rolling operation the outer surfaces of the member are given the desired degree of smoothness.

In some instances it is desirable to provide for variations in the permeability of a sheet so that, in use, different results may be attained in different areas of such a sheet, and this may be accomplished in different ways. Thus, in FIG. 9 of the drawings, a woven wire fabric 330A is illustrated wherein the wires 338A extending in one direction, such as the wires that serve as the warp, are made of gradually varying diameter so that when the transverse wires 339A that serve as the weft are woven onto the wires 338A, a wire fabric of gradually varying permeability is produced, and after such fabric has been woven, it is subjected to a rolling operation, as hereinabove described, to impart the desired degree of smoothness to the surfaces thereof.

The permeable skin material of the present invention may also be made of varying permeability by weaving a fabric that has uniform characteristics of permeability throughout its entire area and by thereafter treating portions of this fabric to produce different permeabilities in different areas or sections thereof. This treatment may be accomplished in different ways, certain of which act to build up the wired diameter in the treated areas and thus reduce the permeability in such areas, while in others the wired diameter is reduced, thus to increase the permeability in the treated areas, and the final product of such treatment is illustrated at 430A in FIG. 10 of the drawings.

Thus, by shot peening in selected areas and in selected amounts, the effective area of the wires may be varied to decrease the permeability in the treated areas. Similarly, by electroplating, the cross sectional size of the wires may be increased, thus to decrease the permeability where such electroplating is applied.

According to the other mode of providing varying permeability, selected areas of the fabric sheet may be subjected to liquid honing, or to electrolytic displacement, thus to reduce the effective cross section of the wires in the treated areas so as to increase the permeability thereof.

Another mode of treatment is by needle perforation which serves to increase permeability in the areas that are subjected to such treatment.

The various treatments utilized in varying the permeability as just described are preferably applied after an initial rolling operation performed on the fabric, but in some instances such treatment may be applied before rolling. In any event, the fabric may be rolled after such treatment to improve its flatness and smoothness.

Where the permeable skin material is to be utilized for transpiration cooling, it is desirable to afford a permeable skin material that has high heat transfer characteristics in addition to the smooth corrosion resistant outer surface. Thus, as shown in FIG. 11 of the drawings, a compound woven wire fabric 530A is formed having an outer layer 41 and an inner layer 42 with the weft serving to interlock the two layers in the manner shown in FIG. 11. The wires that make up the inner layer 42 may be made from a material such as copper that has a high heat conductivity, and after the fabric is subjected to a rolling operation to provide the desired smooth surfaces. The wires of the outer layer 41 are made from a corrosion resistant material such as stainless steel so that the resulting permeable skin material will have high resistance to corrosion and use.

With the compound wire fabric sheet illustrated in FIG. 11 some objection may be found to the presence of the tie wires of the inner layer 42 in the outer face of the outer layer 41, and where such an arrangement must be eliminated, resort may be had to a compound wire fabric 630A having three or more layers as shown in FIG. 12 of the drawings. As shown in FIG. 12, the outer layer 141 and the middle layer 142 are made from a corrosive resistant wire such as stainless steel wire, while the inner layer 143 is made from a wire such as copper having a high degree of heat conductivity. With such an arrangement all of the wires in the exposed outer surface of the permeable wire sheet 630A will be of corrosion resistant material, while the inner layer, which is made from a material such as copper, will be protected and yet will be in heat transfer relationship to the outer layers of the sheet. After formation of the compound fabric 630A of FIG. 12, this fabric is subjected to a rolling operation so as to impart a smooth surface thereto.

It will be evident of course that heat treatable metal may be employed in the fabrication of the permeable sheet, and after the primary forming operations the sheet may be heat treated to attain added hardness and increase its strength and rigidity.

From the foregoing description it will be apparent that the present invention provides an improved permeable airfoil skin material in which the desired permeability may be attained readily and accurately, and in which the requisite strength and adaptability to present assembly methods are attained.

Thus while I have illustrated and described the invention in preferred embodiments, it will be recognized that changes and variations may be made within the spirit and scope of the invention.

I claim:

1. A permeable airfoil skin material adapted to span the spaces between internal frame elements of an airfoil and comprising a woven wire fabric sheet with both its warp and weft made from stainless steel wire of original round cross section to impart structural strength and corrosion resistance to the sheet and with those portions of the wires appearing on at least one of the faces of the sheet being rolled so as to be disposed substantially in a common plane to impart surface smoothness to such face of the sheet.

2. A permeable airfoil skin material adapted to span the spaces between internal frame elements of an airfoil and comprising a compound woven wire fabric sheet having the outer and inner layers thereof formed respectively of stainless steel which imparts structural strength and corrosion resistance to the sheet and from wire having a high heat transmission coefficient, the portions of the wire appearing on the outer face of the sheet being disposed substantially in a common plane to impart surface smoothness to said face.

References Cited in the file of this patent

UNITED STATES PATENTS

| 1,678,941 | Helman | July 31, 1928 |
|---|---|---|
| 1,767,814 | Reynolds | June 24, 1930 |
| 1,983,617 | Ladon | Dec. 11, 1934 |
| 2,126,042 | Reinz | Aug. 9, 1938 |
| 2,160,715 | Blaisdell et al. | May 30, 1939 |
| 2,249,940 | Bulloch | July 22, 1941 |
| 2,257,993 | Young | Oct. 7, 1941 |
| 2,355,963 | Ennor | Aug. 15, 1944 |
| 2,427,853 | Goodlett | Sept. 23, 1947 |
| 2,436,578 | Korn et al. | Feb. 24, 1948 |
| 2,455,838 | Wallis | Dec. 7, 1948 |
| 2,533,439 | Elder | Dec. 12, 1950 |
| 2,669,003 | O'Bitz | Feb. 16, 1954 |
| 2,749,061 | Franz | June 5, 1956 |
| 2,757,435 | Bihaly | Aug. 7, 1956 |

OTHER REFERENCES

"Stainless Iron And Steel," by J. H. G. Monypenny, volume 1, third edition revised, Chapman & Hall Ltd., pages 157 and 158. (Copy in Division 3.)